United States Patent
Chartier et al.

(10) Patent No.: US 7,695,559 B1
(45) Date of Patent: Apr. 13, 2010

(54) PREPARATION OF CEMENT FILMS BY TAPE CASTING

(75) Inventors: Thierry Chartier, Feytiat (FR); Youssef El Hafiane, Limoges (FR); Agnes Smith, Limoges (FR); Jean-Pierre Bonnet, Carignan de Bordeaux (FR)

(73) Assignees: Centre National de la Recherche Scientifique (C.N.R.S.), Paris (FR); Ecole Nationale Superieure de Ceramique Industrielle (ENSCI), Limoges (FR)

( * ) Notice: Subject to any disclaimer, the term of this patent is extended or adjusted under 35 U.S.C. 154(b) by 687 days.

(21) Appl. No.: 11/579,030

(22) PCT Filed: Apr. 28, 2005

(86) PCT No.: PCT/FR2005/001061

§ 371 (c)(1),
(2), (4) Date: Oct. 30, 2006

(87) PCT Pub. No.: WO2005/115943

PCT Pub. Date: Dec. 8, 2005

(30) Foreign Application Priority Data

Apr. 29, 2004 (FR) .................................. 04 04584

(51) Int. Cl.
*C04B 24/04* (2006.01)

(52) U.S. Cl. ..................... 106/692; 106/693; 106/713; 106/724; 106/726; 106/727; 106/823; 264/650

(58) Field of Classification Search ................. 106/692, 106/693, 713, 724, 726, 727, 644, 728; 264/650
See application file for complete search history.

(56) References Cited

U.S. PATENT DOCUMENTS 4,394,175 A       7/1983   Cheriton et al.

FOREIGN PATENT DOCUMENTS

| FR | 2778787 | 11/1999 |
| GB | 1288613 | 9/1972 |
| WO | 01/76534 | 10/2001 |

OTHER PUBLICATIONS

"Electrical properties of chemically bonded ceramics based on calcium aluminate," Brian P. Borglum et al., Advanced Cement Based Materials, vol. 1, No. 1, Oct. 1993, pp. 47-50.
"Rapid setting agent for blowing concrete and its production method, and blowing method of blowing concrete," Hiroshi Nakajima, Chemical Abstracts Service, XP002312575, Oct. 15, 2003.
"Rapid-setting self-leveling materials for floors," H. Shimatani, Chemical Abstracts, XP000157745, vol. 109, No. 14, Oct. 3, 1988.

*Primary Examiner*—Paul Marcantoni
(74) *Attorney, Agent, or Firm*—Young & Thompson

(57) ABSTRACT

A cement suspension includes the following, in relation to the cement material: water (22-35% by weight); acetic acid (1-10% by weight); plasticizer (up to 8% by weight); and dispersant agent (0-2% by weight), having an apparent viscosity of 0.5-2 Pa·s for the casting speed gradient. Pieces of cement that are prepared from the suspension and which can be used as electronic components are also disclosed.

19 Claims, 1 Drawing Sheet

PREPARATION OF CEMENT FILMS BY TAPE CASTING

The present invention relates to a method of preparing cement components and to a cement suspension useful for the application of the method. It also relates to cement components produced in this way and their applications, particularly in the form of microelectronic components.

Components such as the substrates of integrated circuits or multilayer capacitors are commonly made from what are known as "technical" ceramic materials. These materials have the requisite electrical properties and can be formed into films having controlled thicknesses and surface textures.

One of the principal methods of forming these ceramics is tape casting. This consists in preparing a stable suspension of powder in a solvent, generally organic, in the presence of additives such as dispersing, binding and plasticizing agents. The suspension is cast onto a carrier and then laminated if required by pressing between the doctor blade and the carrier. After the evaporation of the solvent, the film is subjected to a high temperature to sinter it and remove the binder.

This method can be used to form thin ceramic films, with a typical thickness from 25 microns to 2 mm, having a large surface area and satisfactory surface texture and mechanical strength. However, the raw materials for these components are rather costly. Furthermore, the preparation method requires a large quantity of solvents. Finally, the sintering stage requires high-temperature treatment.

The object of the invention is therefore to propose an economical and environmentally friendly method for preparing suitable components, particularly for use as electronic components.

More specifically, the invention proposes a method for preparing cement components by tape and mould casting.

The term "components" denotes films, produced by tape casting for example, and non-flat components, having a wide range of dimensions and shapes, produced by molding for example.

Now, cements are inexpensive. They can be used by means of an ecologically clean method. Finally, their preparation requires a low energy input, since the consolidation can take place at ambient temperature.

However, the tape and mould casting method requires the control of numerous parameters of the suspension, particularly those relating to the rheological behavior of the suspension. These parameters depend on the nature and content of the constituents of the suspension (solvent, dispersing agent, binder, plasticizer) and the physical and chemical characteristics of the powder. In the specific case of cement, the physical and chemical phenomena related to hydration also depend on the time and temperature.

Thus a first object of the invention is to propose a cement suspension compatible with the tape and mould casting method.

The Cement Suspension

The suspension according to the invention has a rheological behavior compatible with the tape and mould casting method.

The apparent viscosity, also called dynamic $\eta$, is the ratio between the shear stress, $\tau$, and the shear rate gradient, $\gamma$.

A distinction is made between the different rheological behaviors of what are known as Newtonian fluids, shear thickening fluids and shear thinning fluids.

For Newtonian fluids, the proportionality factor between the shear stress and the shear rate gradient is constant: this is the viscosity. A shear thinning or pseudoplastic behavior is characterized by a decrease in apparent viscosity when the rate gradient increases. Conversely, shear thickening or dilating behavior is present when the apparent viscosity increases with the rate gradient.

Preferably, the suspension has shear thinning behavior. Such behavior ensures good spreading during casting and prevents the sedimentation of the suspension. Additionally, the suspension advantageously has a viscosity suitable for its casting, generally in the range from 0.5 to 2 Pa s.

More precisely, the cement suspension comprises, with respect to the mass of cement:
  22% to 35% by weight of water;
  1% to 10% by weight of acetic acid;
  up to 8% by weight of plasticizer; and
  0 to 2% by weight of dispersing agent.

The suspension can be prepared by using any type of cement, such as Portland cement or calcium aluminate cement. The choice will essentially depend on the proposed application.

However, calcium aluminate cement has certain advantages, such as a rapid development of mechanical strength. Furthermore, its high alumina content imparts a low basicity and therefore a high resistance to chemical attack, and refractory properties.

Preferably, calcium aluminate cement comprises 60% to 80%, and particularly 65% to 75% by weight of alumina and 15% to 35% of CaO and, finally, 0.1% to 5% of other components, particularly oxides such as $SiO_2$, MgO, and $Fe_2O_3$.

The particle size distribution of the cement and the shape of the particles are important for the rheological behavior and the dispersion of the suspension. They also affect the microstructure and final properties of the hardened material.

This is because a small mean particle diameter makes it possible to obtain a high specific surface area and therefore a high reactivity of the powder. Such suspensions are stable, but require the use of a large quantity of organic additives, which reduces the unfired density of the films.

The size of the cement particles in the suspension used is therefore generally a compromise between ease of forming and reactivity of the powders.

If necessary, an excessively large particle size of a cement can be reduced by one of the known methods. One example is the method of grinding, particularly attrition grinding. This kind of grinding consists in the agitation of hard objects (such as alumina balls) in the powder to be ground, mixed with a solvent.

However, screening has been found to produce particle size distributions very similar to those obtained by grinding, with much less effort. Consequently, screening is preferred for the extraction of cement particles having the desired mean particle size.

The size of the screen chosen depends, in particular, on the thickness of the film to be prepared. As a general rule, a screen with a 20 to 100 micron mesh is chosen, or preferably 30 to 50 microns.

The quantity of solvent (water) present in the cement suspension depends on the desired load factor. The load factor is defined as the ratio by weight or volume between the cement and the solvent combined with the additives. It is determined according to the desired viscosity.

In the case of cement, when the solvent is water, a W/C ratio is commonly defined, expressing the ratio by weight between the water and the cement. The suspension according to the invention preferably has a W/C ratio of 0.22 to 0.35.

The cement suspension also comprises additives, each having a clearly specified function. Each of these constituents affects the rheological behavior of the suspension, as well as the hydration behavior. They can also have an effect on the microstructure of the hardened material and consequently on its properties.

This is because it is not sufficient for a suspension to have a rheology enabling tape or mould casting to be carried out. The cast film or the component must also develop sufficient strength to enable it to be handled.

According to the invention, the cement suspension comprises acetic acid, mainly as a setting regulation additive. However, this additive also acts as a dispersing agent.

This is because acetic acid has a setting delaying effect at low concentration. On the other hand, at a higher concentration, it causes very fast setting, typically within two hours.

For tape casting, fast setting is desirable to facilitate the handling of the films and permit a high production rate. A cement suspension for tape casting typically comprises 1% to 10%, preferably 1% to 5%, and in particular 1% to 3% by weight of acetic acid with respect to the mass of cement.

A dispersing agent properly so called can also be added to the suspension. The dispersing agent makes it possible to stabilize a suspension having a large solid/liquid ratio with respect to sedimentation and agglomeration forces.

This dispersing agent can be chosen from those regularly used for cement. Examples of particularly suitable agents are ammonium poly(meth)acrylates, sodium sulfonate polynaphthalenes and C1-C4 carboxylic acids.

The quantity of dispersing agent added depends, in particular, on the size of the cement particles and on the load rate. Generally, a quantity of 0 to 4% by weight of dispersing agent with respect to the cement is suitable for the proposed values.

The suspension will thus contain 0 to 2%, and preferably 0.1% to 0.5%, by weight of dispersing agent in addition to the acetic acid.

The suspension can also comprise a binder, if necessary, to impart greater cohesion to the component.

The binder is chosen mainly according to the solvent of the compound.

Organic binders generally have long polymer chains. These molecules are adsorbed on the surfaces of the particles between which they create links. This forms a rigid skeleton which can impart adequate mechanical strength to the resulting film.

The binders commonly used in aqueous media include acrylic latexes, cellulose derivatives and polyvinyl alcohols (PVA).

The chosen binder will preferably have a low glass transition temperature, so that the viscosity of the suspension is not increased excessively.

In the case of cement, a binder is not indispensable, because water acts as both a solvent and a binder, causing the consolidation of the cement by the hydration process.

The suspension can also include a plasticizer, to impart a degree of flexibility to the film and contribute to the development of suitable rheological behavior.

The chosen plasticizer can be chosen from those commonly used for ceramics. Particularly suitable plasticizers are those in the glycol group, such as polyethylene glycol, including polyethylene glycol 300 (PEG 300), and the phthalate group, such as dibutylphthalate.

The quantity of plasticizer is chosen in such a way that it will be sufficient to provide the desired effect, without being excessive, in order to prevent any degradation of the breaking stress of the resulting film.

As a general rule, the cement suspension for tape casting includes 0.1% to 8%, preferably 2% to 5%, and in particular 3% to 4% by weight of plasticizer.

Reinforcing materials can be added to the suspension to improve the mechanical strength of the resulting film.

The addition of fibers, particularly glass or polymer fibers or fibers of natural origin such as plant fibers, is preferred.

The proportion of reinforcing material will depend on the material chosen and in particular on the requisite mechanical properties of the film.

As a general rule, 0.01% to 10% of fibers with respect to the volume of cement will be added.

Finally, the suspension can also contain other additives commonly used in this field, such as pigments, fillers, setting regulators and anti-foaming agents.

Preferably, the cement suspension only contains small quantities of organic compounds. In particular, it advantageously contains no organic solvent.

The Method of Preparing the Suspension

The stability of cement suspensions can depend on the order in which the constituents are added. More precisely, the concept of stability signifies the homogeneity of the product and the absence of agglomeration or sedimentation during the process of producing the hardened material.

In this context, it is preferable, for example, to incorporate the dispersing agent before the other additives, to facilitate the dispersion of the cement particles in the water. It is assumed that the adsorption of other additives on the cement particles competes with the adsorption of the dispersing agent and thus reduces its effectiveness.

The cement suspension is prepared by a method comprising the following steps:

i) dispersion of the cement in the water, in the presence of the dispersing agent if necessary;

ii) addition of the plasticizer, if necessary;

iii) homogenization, and, if necessary, iv) deaeration.

Advantageously, the plasticizer is added to the suspension in the form of solution in part of the solvent.

The homogenization is conveniently carried out by mixing the suspension. Deaeration of the suspension eliminates the air bubbles generated during mixing. It can be carried out, for example, on rotating rollers or by any other known method.

The suspension prepared in this way is preferably cast immediately, in order to prevent the suspension from developing towards the hydration process.

The Method of Preparing the Cement Components

When the cement suspension has been prepared, the method of preparing cement films or components comprises the following steps:

a) providing a carrier or a mould;

b) introducing the cement suspension into a reservoir;

c) casting an appropriate quantity of said suspension by lamination from the reservoir onto said carrier or into said mould.

The carrier and the mould can be made from any material commonly used for ceramic forming, such as stainless steel, glass or plastics.

The process can be carried out continuously or in batches. In the first case, and for tape casting, step c) is carried out with a device in which the carrier moves under a fixed reservoir. In the second case, the reservoir moves over a fixed carrier.

In the case of continuous casting, the carrier is movable in a trajectory which is not always straight, and therefore a degree of resilience of the carrier is required. In this case, stainless steel carriers are preferred. In the case of batch casting, the glass carrier is preferred for reasons of cost.

For further details of the tape casting process, reference should be made to T. Chartier, "Procédés de mise en forme des céramiques", in: "Matériaux et processus céramiques", Hermés Science Publication, Paris, 2001, 141-217.

Advantageously, the substrate (carrier or mould) is previously coated with an anti-adhesion coating. Such coatings are known, and are based on silicone for example.

The component produced in this way hardens by a process of hydration of the cement at ambient temperature.

Advantageously, the method also comprises the following step:

d) consolidation of the component in a humid environment.

The humid environment can be, for example, air saturated with moisture or water. This step enables a greater hydration of the cement to be achieved, and thus produces cement components having adequate mechanical strength.

The consolidation of the cement components in water is particularly advantageous for films prepared by tape casting, since it enables the organic products to be eliminated from the cement by solubilization. This process is simpler than the thermal binder removal process used for ceramics, which requires heat treatment at high temperatures (500-600° C.).

Thus the temperature of this step is preferably moderate compared with the temperature required for ceramic sintering, being less than 50-60° C. and, in particular, equal to ambient temperature.

Finally, the components are preferably subjected to a heat treatment for eliminating the free water in order to improve their electrical properties and decrease their coefficient of expansion. This treatment can be carried out at low temperature, typically from 100° C. to 300° C.

The Finished Components

The surface of the cement components prepared in this way generally has a very low degree of roughness, Ra, that is less than 1 micron, preferably less than 750 nm, and in particular less than 500 nm. Additionally, the cement components prepared in this way have no cracks visible to the naked eye.

The finished cement components also have a low dielectric constant after heat treatment. Typically, the dielectric constant is close to 10 after heat treatment at 200° C. and remains unchanged between 1 MHz and 850 MHz.

Thus, the cement components produced in this way have a low coefficient of expansion ($6.8 \times 10^{-6}$ between 25° C. and 1200° C. for a film subjected to heat treatment).

Finally, the cement components containing bound or free-water have a high diffusivity. This property is proportional to the thermal conductivity, and therefore the components are expected to have high thermal conductivity.

The physical properties of the finished cement components make them useful for applications in electronics, particularly as substrates for electronic circuit cards. Applications even at high temperatures can be considered where the components are based on high alumina cement. The mechanical properties can be improved further by adding reinforcing materials such as fibers.

Finally, the components, particularly fiber-reinforced components, can also be applied in other fields, for example in building.

The invention is explained more fully in the non-restrictive examples given below and by means of the figures, of which:

EXAMPLES

Unless specified otherwise, the proportions shown below are given in % by weight with respect to the weight of the cement.

Rheological Characteristics of the Suspensions

The rheological measurements were made with a rotating cylinder rheometer in constant mode (Haake Viscotester VT550 with the MVII measuring device). This device can be used to measure the shear stress τ as a function of the rate gradient γ:

The operating protocol followed for the viscosity measurement was:

a rise in rate of 0.1 up to 100 s$^{-1}$ for 30 seconds;

a wait time equal to the period of rising to the maximum rate gradient (30 seconds);

a decrease in the rate gradient during the same period as the rise (30 seconds) to a rate gradient value of 0.1 s$^{-1}$.

Mechanical Characteristics

Two types of tests were conducted, one on the hardened material itself and the other on the film.

Figure 1:
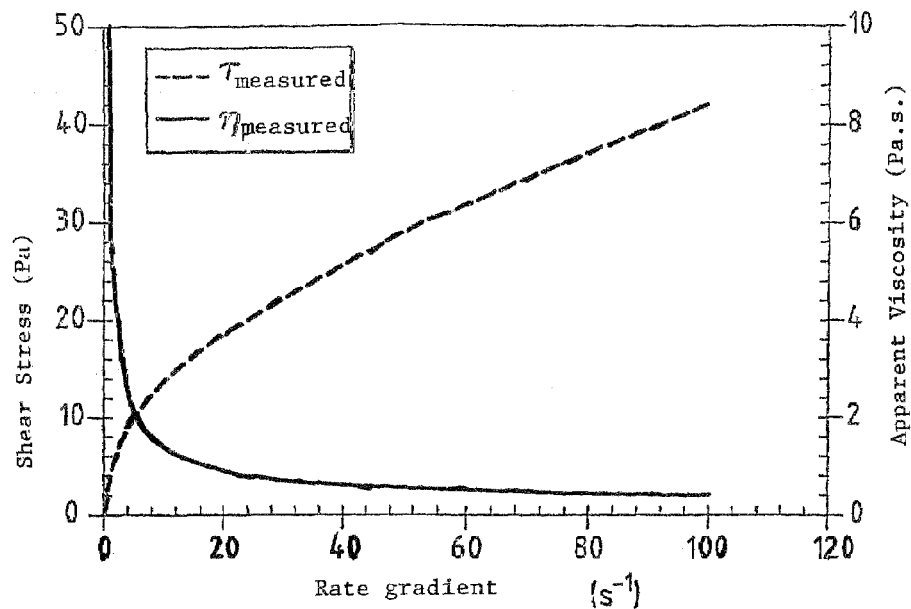
FIG. 1 shows the flow curve of a cement suspension according to Example 1.
Figure 2:
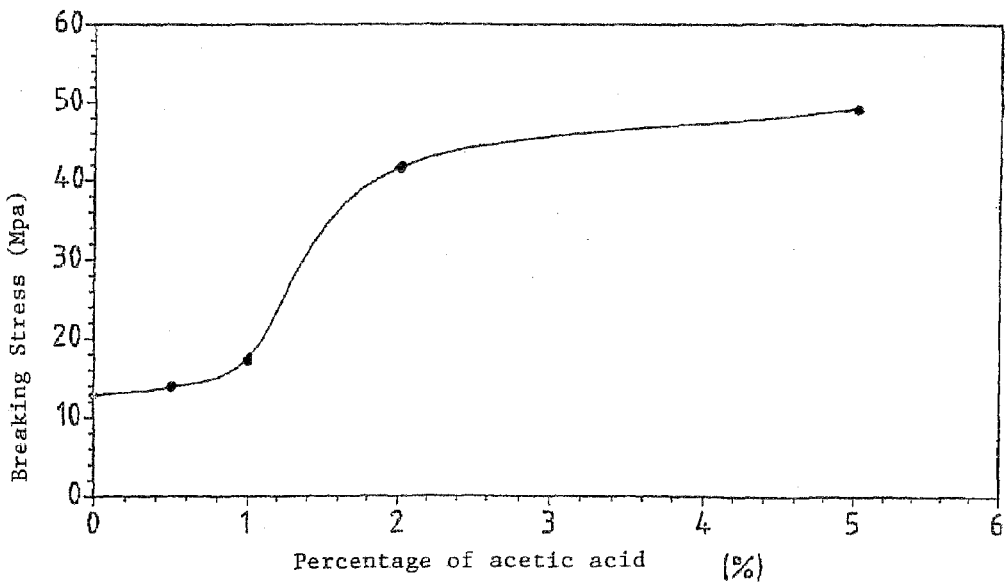
FIG. 2 shows the breaking stress of finished cement cylinders as a function of the concentration of acetic acid.

1) Characterization of the mechanical strength of the specimens in the presence of acetic acid only (FIG. 2). The mechanical strength test that we used is a compression strength test on cylinders having a thickness, e, of 20 mm and a diameter, D, of 33 mm.

The compression strength, $\sigma_R$, is given by the relation: force applied, $F_a$, on the surface of the section of the cylinder (1):

$$\sigma_R = \frac{F_a}{\pi \left(\frac{D}{2}\right)^2} \tag{1}$$

2) characterization of the mechanical strength of films (result of example 6).

The mechanical strength of films was determined by a four-point bending test on plates having the following dimensions (Length×width (b)×thickness (h): 100×20×1 mm$^3$.

The plate rests on two simple supports separated by a distance u, and the load $F_a$ is applied at two points, separated by a distance v, placed symmetrically about the center of the span. If the cross section of the test piece is b×h, the strength $\sigma_R$ is given by equation (2):

$$\sigma_R = \frac{3F_a(u-v)}{bh^2} \tag{2}$$

The distance u between the supports is 40 mm and the distance v between the points of application of the forces is 20 mm.

These tests were conducted using an M30K device (J. J. Instruments SA).

Microstructural Characteristics of the Hardened Material

The roughness of the films was measured with a Perthometer C5D surface roughness tester.

After 2 hours of setting in air, the films were placed in water to complete the hydration and eliminate the organic compounds, and were kept in the water for 4 days.

The porosity was determined by mercury porosity measurement, using an Autopore II Micrometrics 9200 device.

Thermal and Electrical Characteristics

The diffusivity of the hardened material was measured by the laser flash method on the front face. A very brief heat pulse is directed towards the front face of the disk-shaped specimen and the variation of temperature on the rear face is recorded.

The coefficient of expansion was determined using an Adamel D124 dilatometer with a heating rate of 10° C./min. up to 1300° C. under an air stream.

The dielectric permittivity was measured in cylindrical beads of the hardened material, using an HP 4291 A impedance analyzer.

Example 1

Preparation of a Cement Suspension 29.7 g (90% of the total mass of water, 33 g) of distilled water, to which 2 g of acetic acid and 0.1 g of Bevaloid 35 L (from Rhodia, France) were added, was mixed with 100 g of cement (Secar 71, from Lafarge, France).

3.3 ml of water (the remaining 10%), to which 4 g of plasticizer (PEG 300, from Prolabo, France) had been added, was then introduced and the mixing was repeated. The mixing was carried out in a domestic blender (Kenwood) according to the NF EN 196-3 standard, in a number of stages as follows:

a) the cement was mixed with 90% of the solvent, to which dispersing agent had been added, for 90 s at slow speed (speed 1);
b) the machine was stopped for 15 s and the walls of the mixer bowl were scraped;
c) mixing was carried out for 90 s at high speed (speed 3);
d) the machine was stopped for 15 s and the walls of the mixer bowl were scraped;
e) the remaining 10% of water, to which plasticizer and binder had been added if necessary, was introduced;
f) mixing was carried out for 90 s at low speed (speed 1).

The W/C ratio of the suspension was 0.33.

The physical properties of the cement films were characterized as described above. The results are given in Table 1.

The tape casting device used is marketed by Elmceram, France Oradour/Vayres 87150.

The surface of the resulting cement films is free of cracks and has a roughness Ra of less than 1 micron.

The measured dielectric constant is close to 10 after heat treatment at 200° C. and remains unchanged between 1 MHz and 850 MHz.

Finally, after the same heat treatment, the cement films produced in this way have a coefficient of expansion of $6.8 \times 10^{-6}$ $C.^{\circ-1}$ between 25° C. and 1200° C.

TABLE 1

| Specimen | Roughness, Ra (nm) | Dielectric constant, $\epsilon'_r$ | Coefficient of expansion $(C.^{\circ-1})$ |
|---|---|---|---|
| Example 1 | <500 | ~10 | $6.8\ 10^{-6}$ |

It is clear from the above that the described method of tape casting of cement suspensions can be used to produce cement films whose physical characteristics and thermal behavior are compatible with an application, particularly to electronics.

Examples 2 to 5

To study the effect of acetic acid on setting and on the microstructure of the hardened material, we prepared cement suspensions (Secar 71 from Lafarge, France screened to 40 microns) according to Example 1 (without the other additions), varying the ratio by weight of acetic acid to cement, while maintaining the W/C ratio at 0.6.

The percentage of acetic acid $m_{HOAc}/m_{cement})\times 100$ was 0; 0.5; 1 and 5% by weight, respectively.

The initial setting time of the suspensions was determined at 20° C. by the Vicat needle test. We found that the initial setting time of a suspension not containing acetic acid was approximately 6 hours, increasing to 43 hours for a suspension containing 0.1% by weight of acetic acid. This delay is setting becomes more marked and reaches 52 hours with 0.5% by weight of acetic acid. However, the initial setting time then decreases sharply to 2 hours with 1% by weight of acetic acid. Beyond this percentage there is little variation.

Thus the presence of acetic acid in the cement suspension in an appropriate concentration permits quick setting of the cement film.

FIG. 2 shows the breaking stress found for the cylinders as a function of the percentage of acetic acid. We found that a percentage of more than 1% of acetic acid resulted in films having greater mechanical strength. The presence of 5% acetic acid thus enables the breaking stress to be multiplied by a factor of approximately 4.

It was also found that the open pore volume of the hardened products was less than 9% by volume, with a pore size of less than 100 nm.

By comparison, a similar suspension without acetic acid results in an open pore volume of the order of 25% by volume, with a pore size ranging from 500 nm to 10 μm.

The presence of acetic acid therefore leads to the production of a well densified hardened material, having a low porosity, characterized by a low pore volume and small pore size. The reduced porosity then contributes to the improvement of the mechanical characteristics.

Example 6

A suspension as in Example 1 was prepared, but with the addition of 29% by weight of sand with respect to the weight of the cement and sand, and 5% by volume of fibers with respect to the cement.

The sand used was a sand from Fontainebleau, France with grains of less than 200 μm and a mean diameter $d_{50}$ of 168 μm.

The fibers used were glass fibers (Vetrotex Cem-Fil Fibers from Saint-Gobain, France). These are long unidirectional fibers grouped in strands of 1000 units, each having a diameter of 14 μm.

The breaking stress of the hardened material was of the order of 50 MPa.

The invention claimed is:
1. A cement suspension comprising, with respect to the mass of cement:
   22% to 35% by weight of water;
   1% to 10% by weight of acetic acid;
   up to 8% by weight of plasticizer; and
   0 to 2% by weight of dispersing agent, and having an apparent viscosity for the casting rate gradient of 0.5 to 2 Pa s.
2. The suspension as claimed in claim 1, wherein the cement is a calcium aluminate cement.

3. The suspension as claimed in claim 2, wherein the plasticizer is selected from the group consisting of the polyalkylene glycol group, and the phthalate group.

4. The suspension as claimed in claim 1, wherein the dispersing agent is selected from the group consisting of the ammonium poly(meth)acrylates, sodium sulfonate polynaphthalenes, C1-C4 carboxylic acids, and mixtures of the ammonium poly(meth)acrylates, sodium sulfonate polynaphthalenes, and C1-C4 carboxylic acids.

5. The suspension as claimed in claim 1, additionally comprising 0.01 to 10% by volume of fibers.

6. The suspension as claimed in claim 5, wherein the fibers are glass fibers or natural fibers.

7. The suspension as claimed in claim 1, wherein the cement comprises 60% to 80% by weight of alumina.

8. The suspension as claimed in claim 1, having an apparent viscosity in the range from 0.5 to 2 Pa s for the casting gradient.

9. A method of preparing the suspension according to claim 1, comprising the following steps:
   i) dispersing the cement in a solvent, using a dispersing agent;
   ii) adding a binder and/or a plasticizer
   iii) homogenization, and
   iv) deaeration.

10. A method of preparing cement film, comprising the following steps:
   a. providing a carrier or a mould;
   b. introducing the suspension as claimed in claim 1 into a reservoir positioned on the carrier or mould; and
   c. casting an appropriate quantity of said suspension by lamination from the reservoir onto said carrier.

11. The method as claimed in claim 10, wherein the carrier is movable.

12. The method as claimed in claim 10, wherein the reservoir is movable.

13. The method as claimed in claim 9, additionally comprising the following step:
   d. consolidation of the film in a humid environment.

14. The method as claimed in claim 13, wherein the humid environment is air saturated with moisture or water.

15. A cement film which can be produced by the method as claimed in claim 9.

16. The film as claimed in claim 15, in the form of a film having a thickness in the range from 25 to 3000 µm.

17. A method of using a cement film according to claim 1 as a substrate for electronics.

18. The suspension as claimed in claim 3, wherein the plasticizer is polyethylene glycol.

19. The suspension as claimed in claim 3, wherein the plasticizer is dibutylphthalate.

* * * * *